United States Patent
Diab et al.

(10) Patent No.: US 9,667,557 B2
(45) Date of Patent: *May 30, 2017

(54) SYSTEM AND METHOD FOR MULTI-PAIR CONFIGURATION OVER EXISTING CABLING INFRASTRUCTURE

(71) Applicant: Avago Technologies General IP (Singapore) Pte. Ltd., Singapore (SG)

(72) Inventors: Wael William Diab, San Francisco, CA (US); Kevin Clyde Brown, Long Beach, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 82 days.

This patent is subject to a terminal disclaimer.

(21) Appl. No.: 14/672,895

(22) Filed: Mar. 30, 2015

(65) Prior Publication Data

US 2015/0207744 A1 Jul. 23, 2015

Related U.S. Application Data

(63) Continuation of application No. 13/757,916, filed on Feb. 4, 2013, now Pat. No. 8,995,298.

(60) Provisional application No. 61/650,685, filed on May 23, 2012.

(51) Int. Cl.
| | |
|---|---|
| *H04L 1/00* | (2006.01) |
| *H04L 12/825* | (2013.01) |
| *H04L 12/24* | (2006.01) |
| *H04L 12/12* | (2006.01) |
| *H04L 12/26* | (2006.01) |

(52) U.S. Cl.
CPC ............ *H04L 47/25* (2013.01); *H04L 1/0002* (2013.01); *H04L 12/12* (2013.01); *H04L 41/0823* (2013.01); *H04L 41/0826* (2013.01); *H04L 41/0833* (2013.01); *H04L 43/0882* (2013.01); *Y02B 60/33* (2013.01); *Y02B 60/34* (2013.01); *Y02B 60/43* (2013.01)

(58) Field of Classification Search
CPC ... H04L 47/25; H04L 41/0826; H04L 1/0002; H04L 43/0882; H04L 41/0823
USPC ........................................................ 370/252
See application file for complete search history.

(56) References Cited

U.S. PATENT DOCUMENTS

| | | | |
|---|---|---|---|
| 8,995,298 B2 * | 3/2015 | Diab | ............... H04L 41/0823 370/252 |
| 2006/0023756 A1 | 2/2006 | Meier | |
| 2006/0039384 A1* | 2/2006 | Dontu | ................... H04L 45/00 370/400 |
| 2011/0116391 A1 | 5/2011 | Chien et al. | |

(Continued)

OTHER PUBLICATIONS

Notice of Allowance for U.S. Appl. No. 13/757,916 mailed Dec. 5, 2014.

*Primary Examiner* — Chi H Pham
*Assistant Examiner* — Alexander O Boakye
(74) *Attorney, Agent, or Firm* — Foley & Lardner LLP

(57) ABSTRACT

A system and method for multi-pair configuration over existing cabling infrastructure. In one embodiment, a network device is configured through a selective activation of one or more physical layer devices that are coupled to a respective one or more of the conductor pairs that are identified in a diagnostic process. Aggregation can be performed on the data streams carried over the activated conductor pairs.

20 Claims, 5 Drawing Sheets

(56) References Cited

U.S. PATENT DOCUMENTS

2012/0263141 A1* 10/2012 Taghavi Nasrabadi ............. H04W 72/02 370/330

* cited by examiner

SYSTEM AND METHOD FOR MULTI-PAIR CONFIGURATION OVER EXISTING CABLING INFRASTRUCTURE

This application is a continuation of and claims priority to and the benefit of U.S. patent application Ser. No. 13/757, 916, filed Feb. 4, 2013, which claims priority to provisional application No. 61/650,685, filed May 23, 2012, which are incorporated herein by reference in their entireties for all purposes.

BACKGROUND

Field of the Invention

The present invention relates generally to networking and, more particularly, to a system and method for multi-pair configuration over existing cabling infrastructure.

Introduction

Ethernet devices continue to evolve in capability as the incremental increases in the standardized transmission rates have progressed by orders of magnitude. In a relatively short period of time, transmission rates for standardized Ethernet devices have progressed from 10 Mbit/s to 100 Mbit/s, from 100 Mbit/s to 1 Gbit/s, from 1 Gbit/s to 10 Gbit/s, etc. Efforts are ongoing to identify the next transmission rate that is to be adopted as the next standard of Ethernet performance.

The significant advances in the standardized transmission rates has provided substantial benefits in increasing the available bandwidth in an Ethernet network. These large increases in available bandwidth have enabled significant changes in the applications that can be supported across various types of networks. As the cost of bandwidth has decreased, so also have the performance barriers that have hindered certain types of applications.

Notwithstanding the substantial benefits that have been realized by the large increases in data transmission rates, those same large increases in data transmission rates can likewise create other cost barriers that can hinder the deployment of some applications. Balancing the benefit of the increased data transmission rate are the implementation costs such as system complexity, physical plant improvements (e.g., cabling), increased power consumed, etc. These implementation costs may be justified in those instances where the full benefits of the increased data transmission rate are being realized. Where the full benefits of the increased transmission rate are not being realized, however, the implementation costs can dominate and other potential solutions are needed.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
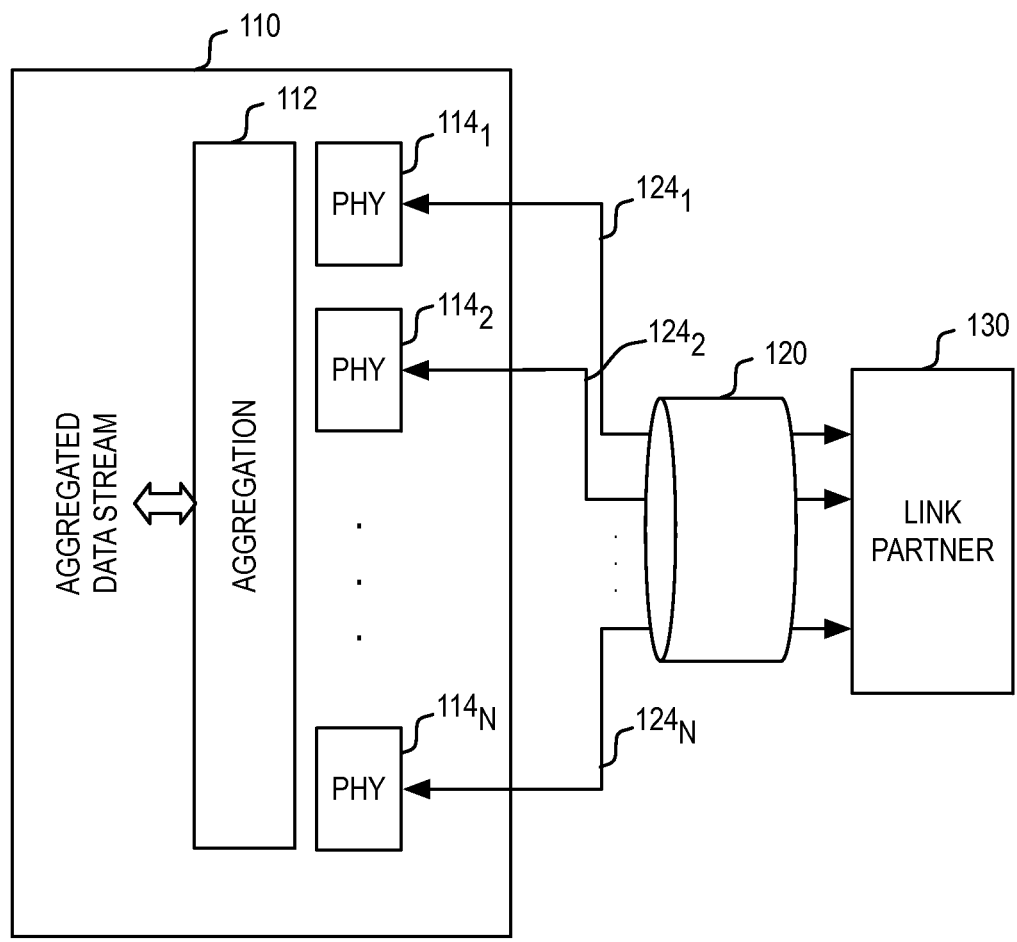
FIG. 1 illustrates an embodiment of a mechanism that can leverage an existing cabling infrastructure.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The advances in standardized Ethernet communication have faced significant limitations in its adoption. A first limitation to next-generation adoption is the implementation costs incurred in the deployment of new cabling, connectors and magnetics to support next-generation data transmission rates. Where the location of such a next-generation system deployment is in an existing building, the costs of replacing the cabling infrastructure can prove daunting in the transition from previous-generation data transmission rates.

A second limitation to next-generation adoption is the increased energy costs that would be incurred in supporting the next-generation data transmission rates. Energy efficiency is a key consideration in Ethernet devices as energy costs continue to escalate in a trend that has accelerated in recent years. For that reason, the IT infrastructure has drawn increasing scrutiny as a potential area where energy costs can be reduced. In light of current industry trends, the energy efficiency issues presented by the deployment of next-generation data transmission rates to support data bandwidth needs that are marginally above previous-generation data transmission rates can cause significant energy efficiency concerns.

In the present invention, the implementation costs incurred through next-generation system adoption can be reduced through a solution that obviates the need to deploy transmission equipment that takes a large leap forward to the next standardized data transmission rate level. As described in greater detail below, a mechanism for multi-pair configuration over existing cabling infrastructure is provided that largely removes the burdens imposed by the deployment of the next generation of standardized devices.

In one embodiment, the multi-pair configuration mechanism leverages the existing cabling infrastructure through an initial identification of the communication channel characteristics of the network link. This identification can be performed through cable diagnostics that are designed to determine the number of conductor pairs, the length of the network cable, and the type of network cabling (e.g., Category 3, 5e, 6, 6A, 7, 7A, 8, 8A, etc. Ethernet cabling). Next, a capability exchange is performed between the link partners. In one embodiment, such a capability exchange can be performed using an auto-negotiation process between the link partners that can be extended using next page messaging. After the channel characteristics and the link partner capabilities have been identified, a data transmission rate is selected based on the communication channel characteristics and the capabilities of the link partners. In one embodiment, a selection of a particular signaling mechanism to be used can also be performed. Next, the network device is configured through a selective activation of one or more physical layer devices that are coupled to a respective one or more of the conductor pairs that are identified in the diagnostic process. Aggregation can be performed on the data streams carried over the activated conductor pairs. In one embodiment, the aggregation occurs below the media access control layer. In another embodiment, the aggregation occurs above the media access control layer. The aggregation of the data streams carried over the activated conductor pairs is designed to present an aggregated data stream for use by the network device. In one example, such an aggregated data stream can be a greater than a one gigabit/s data stream. In this example, the greater than one gigabit/s data stream over an existing cabling infrastructure can provide a significant cost/benefit improvement as compared to a ten gigabit/s data stream over a newly-deployed cabling infrastructure. In another embodiment, the link is configured to start with a minimum number of conductor pairs and once the link is up, a capability exchange can be performed (e.g., using Link Layer Discovery Protocol (LLDP)).

Replacing existing cabling infrastructures presents significant cost challenges. For example, the costs to rewire an existing Category 3, 5, or 5e cabling infrastructure in existing buildings may be substantial. A failure to modernize such a cabling infrastructure could prevent the application of new technology. For example, next-generation 802.11ac wireless access points can support wireless links having greater than one gigabit/s data transmission speeds.

In the present invention, it is recognized that a new mechanism is needed to leverage an existing cabling infrastructure to maximize data transmission speeds over the existing cabling infrastructure. FIG. 1 illustrates an example of an embodiment of such a mechanism. As illustrated, network device 110 is coupled to link partner 130 via network cabling 120. Network cabling 120 can represent a part of an existing cabling infrastructure and can include a plurality of conductor pairs $124_n$. For example, up to four copper twisted wire pairs can be included in an Ethernet cable.

In the example embodiment of FIG. 1, each of the conductor pairs $124_n$ is coupled to a respective physical layer device (PHY) $114_n$ via associated connectors, magnetics, etc. Each PHY $114_n$ can be designed to communicate over a single conductor pair $124_n$ with a respective PHY in link partner 130. In one example, PHY $114_n$ can be based on a Broadcom BroadR-Reach® PHY, which is designed to perform all of the physical layer functions for communication over a single copper twisted wire pair (e.g., FlexRay™) at distances up to 1000 meters.

In general, PHY $114_n$ is a Layer 1 device that can be designed to connect a Layer 2 data link layer device (e.g., media access control (MAC) device) to a physical medium. In an example implementation of a PHY, the PHY can include a physical coding sublayer (PCS), a physical medium attachment (PMA) sublayer, and a physical medium dependent (PMD) layer. In combination, the PHY can include suitable logic, circuitry, and/or code that enables transmission and reception of data with a link partner. In this process, the PHY can be configured to handle physical layer requirements, which include, but are not limited to, packetization, data transfer and serialization/deserialization (SERDES).

In the present invention, network device 110 can be designed to configure the operation of PHYs $114_n$ based on a discovery of the physical cabling that connects network device 110 to link partner 130. In that regard, network device 110 can be designed to perform channel diagnostics that examine one or more properties of the communication channel. Here, the identification of the one or more properties of the communication channel can be used to determine a data transmission capacity of the communication channel.

For example, network device 110 can be designed to determine a number of conductor pairs $124_n$ that are available between network device 110 and link partner 130. In another example, network device 110 can be designed to determine a length of network cable 120. In yet another example, network device 110 can be designed to determine a type of cabling (e.g., Category 3, 5e, 6, 6A, 7, 7A, 8, 8A, etc. Ethernet cabling) used to connect network device 110 to link partner 130. In one embodiment, measurements such as insertion loss and cross talk that are performed by a cable diagnostic module can be used to determine the type of cabling. An example of the use of a PHY to perform channel diagnostics is included in U.S. Pat. No. 7,664,972, entitled "System and Method for Controlling Power Delivered to a Powered Device Based on Cable Characteristics," which is incorporated herein by reference in its entirety.

Figure 2:
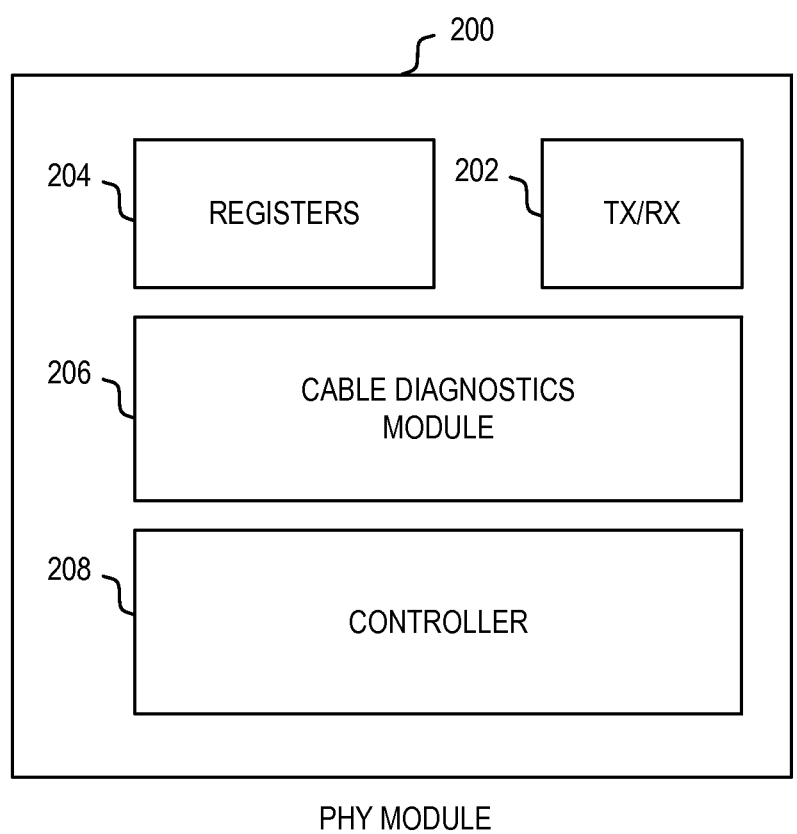
FIG. 2 illustrates an example of a cable diagnostic module in a physical layer device module.

FIG. 2 illustrates an example embodiment of a PHY module that incorporates a cable diagnostics module. As illustrated, PHY module 200 includes transmit/receive (TX/RX) module 202, registers 204, cable diagnostics module 206, and controller 208. In general, TX/RX module 202 facilitates a communication interface between cable diagnostics module 206 and the signals carried on the communication cable. In various embodiments, cable diagnostics module 206 can perform the cable diagnostics independently or in cooperation with an active data communication process that is occurring with a link partner. As would be appreciated, the specific mechanism and corresponding method by which cable diagnostics module 206 operates in the context of a cooperative cable diagnostic would be implementation dependent.

Figure 3:
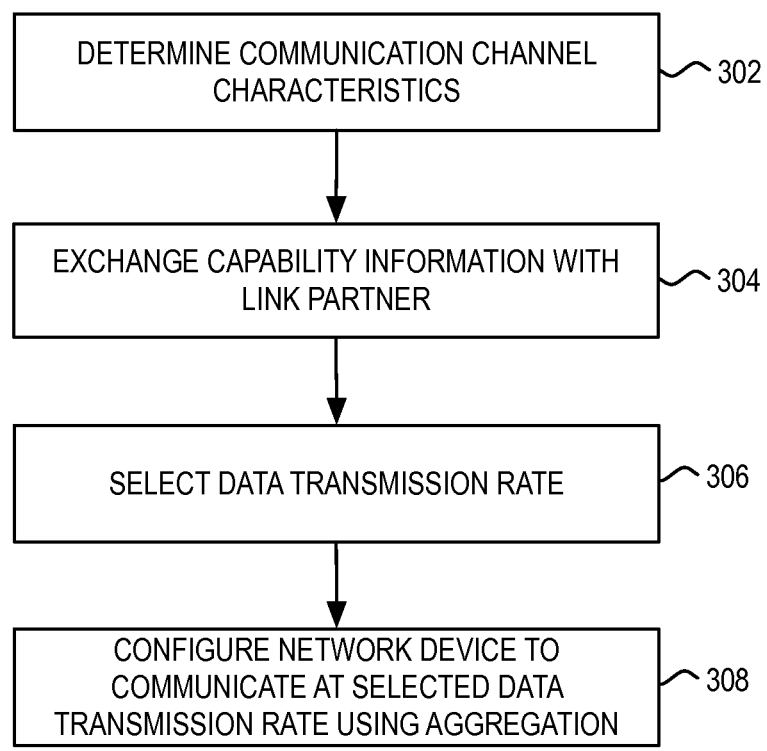
FIG. 3 illustrates a flowchart of a process of the present invention.

Having described an example embodiment of a PHY module, reference is now made to the flowchart of FIG. 3. As would appreciated, the features of the present invention is not limited to the specific sequence of steps illustrated in the flowchart. Variations in the sequence of steps can be used to accomplish the same result of configuring a network device.

As illustrated, the example process begins at step 302 where the communication channel characteristics are determined. The communication cable characteristics can be determined through an identification of various cabling parameters by cable diagnostics module 206, which can be configured to operate under the control of controller 208. In one example, cable diagnostics module 206 can be designed to generate and transmit a signal (e.g., pulses) into the communication cable coupled to the diagnostic device port, and to measure a return or reflected signal received by TX/RX module 202. Signals received by TX/RX module 202 are then processed by cable diagnostics module 206 to determine various cabling parameters reflective of communication channel characteristics.

A simple example of a cabling parameter that can be identified is whether a communication channel is active. This can be determined by whether PHY module 200 detects any link energy. In another example, PHY module 200 can determine a cable length through time-domain reflectometry (TDR), which relies on the transmission of a pulse into the communication cable and the measurement of returned reflections of the transmitted pulse. The cable length or a distance to a cable fault can be determined from the time difference between the transmitted and reflected pulse. In yet another example, PHY module 200 can perform measurements (e.g., insertion loss, cross talk, etc.) that can be used to determine a cabling type (e.g., Category 3, 5e, 6, 6A, 7, 7A, 8, 8A, etc. Ethernet cabling). The measurements taken by PHY module 200 can be stored in memory registers 204 or other memory element. The information stored in memory registers 204 can then be retrieved by a host for configuration of the network device.

The determination of the number of available conductor pairs, the length of the cable, the type of cable, etc. enables a determination of the potential modes of operation (e.g., data rate) that can be used for the transmission of data over the cable. For example, the greater the number of available conductor pairs the greater the communication capacity. Assuming that a single conductor pair can support a 400 Mbit/s data rate, then two available conductor pairs can be combined to support an 800 Mbit/s data rate, while four available conductor pairs can be combined to support a 1.6 Gbit/s data rate. The length of the cable and the cabling type is also relevant to the potential mode of operation. For example, a PHY can accommodate significantly longer link distances when lowering the data rate, or can accommodate lower quality cabling when lowering the data rate.

In addition to identifying the characteristics of the communication channel, network device can also be designed to identify the capabilities of the link partner at step 304. The identification of the link partner's capabilities through an exchange of capability information would enable the network device to identify a common operating mode that can best leverage the identified characteristics of the communication channel.

In one embodiment, network device 110 and link partner 130 can exchange capability information through an auto-negotiation process that is extended via auto-negotiation next-page messages. In one example, the auto-negotiation next-page messages can be used to exchange capability information that relates to the use of BroadR-Reach® abilities over a plurality of conductor pairs. In another embodiment, the link can be designed to start up with a minimum number of pairs (e.g., one pair), and once the link is up, a further capability exchange can be performed using a protocol such as LLDP.

In one embodiment, the auto-negotiation process can be conducted for a set of conductor pairs. In another embodiment, the auto-negotiation process can be conducted for a single conductor pair. In this embodiment, the auto-negotiation process for a single conductor pair can be applied to a plurality of conductor pairs through an advertisement of a number of available conductor pairs or an advertisement of a rate capability per pair along with a number of available conductor pairs.

After the communication channel characteristics have been identified and a capability exchange has occurred, network device 110 and link partner 130 can perform a rate selection at step 306. As would be appreciated, this rate selection process can be performed in a variety of ways depending on the particular implementation of the configuration process. In general, the configuration process is designed to activate one or more of the available conductor pairs to achieve a desired data transmission rate. The desired data transmission rate can represent the maximum possible data rate or can represent the data rate that is sufficient to meet the anticipated data transmission needs between network device 110 and link partner 130.

Here it should be noted that the rate selection process can also be performed in consideration of the signaling mechanism. As would be appreciated, the signaling mechanism can be selected and negotiated between network device 110 and link partner 130. In one embodiment, the signaling mechanism is selected in consideration of the communication channel characteristics, network device capabilities and rate selection. For example, the signaling mechanism can identify the type of modulation (e.g., PAM-5, PAM-16, etc.), voltage levels, signal constellation, error correction, etc. that are used.

After the rate selection process is completed, network device 110 can then configure one or more PHYs $114_n$ at step 308 for operation based on the number of channels to be configured over respective conductor pairs $124_n$. For example, if the configuration process determines that a desired data rate can be achieved using conductor pairs $124_1$ and $124_2$, then network device 110 can configure PHYs $114_1$ and $114_2$ for operation. In general, a particular set of conductor pairs can be selected to produce a desired data rate. For example, operation can be defined for 1 Gbit/s per pair, 1 Gbit/s per two pairs, 2 Gbit/s per pair, 2.5 Gbit/s per pair, 2.5 Gbit/s per two pairs, 5 Gbit/s per pair, 5 Gbit/s per two pairs, 5 Gbit/s per three pairs, etc.

In general, signaling and speed over a conductor pair would relate to the capacity of the channel discovered. In one embodiment, signaling can be based on signaling for a 2.5 Gbit/s channel in a 10 GBASE-T link or a 250 Mbit/s channel in a 1000 BASET-T link. In various scenarios, the 2.5 Gbit/s channel can be slowed down to a 0.5 Gbit/s channel, a 1 Gbit/s channel, a 1.5 Gbit/s channel, etc., or the 250 Mbit/s channel can be sped up to a 500 Mbit/s channel, a 750 Mbit/s channel, a 1 Gbit/s channel, etc.

As illustrated in FIG. 1, PHYs $114_n$ operate in association with aggregation layer 112, which is designed to aggregate data streams supported by PHYs $114_n$ into an aggregated data stream having the selected data rate. Aggregation layer 112 can be embodied in various ways.

Figure 4A:
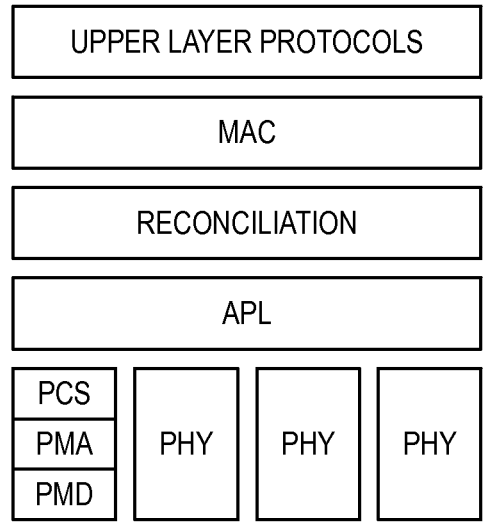
FIGS. 4A and 4B illustrates various embodiments of an aggregation layer in a network device.

As illustrated in FIG. 4A, aggregation at the physical layer (APL) can be used. Here, APL is located below the MAC layer and allows a single IEEE 802.3 MAC sublayer to treat a collection of underlying PHYs as a single logical link. APL can thereby create an Ethernet link that has a bandwidth that is greater than can be achieved by a physical link over a single conductor pair. In general, APL can be designed to separate Ethernet packets into fragments and to distribute the fragments across a collection of PHY interfaces. A sequence number can be used to identify each fragment, thereby allowing a receiving APL sublayer to reconstruct the delivered packets to the receiving MAC.

As would be appreciated, the selective activation of one or more PHYs that have an aggregated data transmission rate that matches the MAC data transmission rate would not yield any significant issues. Where the selective activation of one or more PHYs leads to a mismatch in the interface between the PHY layer and the MAC layer, then a deference mechanism in the transmission direction may need to be used such that the PHY can signal to the MAC to back off on further transmissions.

Figure 4B:
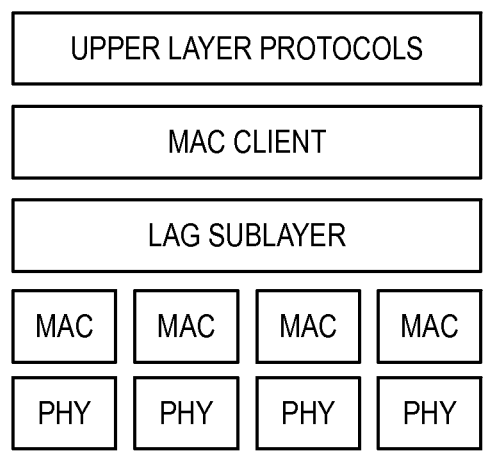

In another embodiment, aggregation can also be performed above the MAC layer. FIG. 4B illustrates an example of such an embodiment. In this example embodiment, a link aggregation (LAG) sublayer is situated above the MAC layer. In presenting a single MAC client interface, LAG sublayer can be designed to perform a frame distribution and collection function. As would be appreciated, the aggregation function can be implemented in various ways within the protocol stack. In yet another embodiment, the aggregation can be performed through teaming, which performs the aggregation at Layer 3 or higher.

Regardless of the particular implementation of the aggregation mechanism, the aggregation enables a configuration of selectively-activated PHYs that are targeted to identified communication channel characteristics. Support of multi-conductor pair operating modes that can produce greater than gigabit/s data transmission rates over existing cable infrastructures is thereby enabled.

As noted, one of the constraints in adopting next-generation data transmission rates is the increased energy costs. In one embodiment, an energy efficiency control policy can be used to minimize a transmission performance impact while maximizing energy savings. In one embodiment, energy efficiency control policies can base their energy-saving decisions on a combination of settings established by an IT manager and the properties of the traffic on the link itself.

Figure 5:
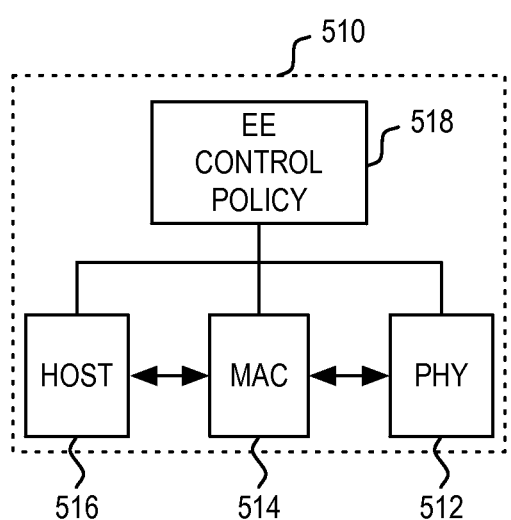
FIG. 5 illustrates an embodiment of an energy efficiency control policy in a network device.

FIG. 5 illustrates an example embodiment of an energy efficiency control policy in a network device. In various embodiments, network device 510 can represent a switch, router, endpoint (e.g., server, client, VOIP phone, wireless access point, surveillance camera, etc.), or the like. As illustrated, network device 510 includes PHY 512, MAC 514, and host 516. As FIG. 5 further illustrates, network device 510 also includes energy efficiency control policy entity 518. In general, energy efficiency control policy entity 518 can be designed to determine when to enter an energy saving state, what energy saving state (i.e., level of energy savings) to enter, how long to remain in that energy saving state, what energy saving state to transition to out of the previous energy saving state, etc.

In general, energy efficiency control policy entity 518 can comprise suitable logic, circuitry, and/or code that may be enabled to establish and/or implement an energy efficiency control policy for the network device. In various embodiments, energy efficiency control policy entity 518 can be a logical and/or functional block which may, for example, be implemented in one or more layers, including portions of the PHY or enhanced PHY, MAC, switch, controller, or other subsystems in the host, thereby enabling energy-efficiency control at one or more layers.

In one example, energy efficient Ethernet such as that defined by IEEE 802.3az can provide substantial energy savings through the use of a low power idle mode and/or subrating. In general, the low power idle mode can be entered when a transmitter enters a period of silence when there is no data to be sent. Power is thereby saved when the link is off. Refresh signals can be sent periodically to enable wake up from the sleep mode. Subrating can be used to reduce the link rate to a sub-rate of the main rate, thereby enabling a reduction in power. In one example, this sub-rate can be a zero rate, which produces maximum power savings. In various embodiments, energy efficiency control policy 518 can be designed to apply energy saving techniques to a particular conductor pair or to a plurality of conductor pairs. For example, energy efficiency control policy 518 can apply subrating to the plurality of conductor pairs by powering off one or more of the activated communication channels.

As would be appreciated, the principles of the present invention can be applied symmetrically or asymmetrically to a link. In one embodiment, power over Ethernet techniques can also be applied to deliver power from a power sourcing equipment to a powered device over one or more of the conductor pairs. In general, the principles of the present invention can be applied to speeds higher than 10 G, such as 40 G, 100 G, 400 G and beyond.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   identifying characteristics of a communication channel in a network link;
   receiving information regarding capabilities of devices associated with the network link;
   selecting a data transmission rate;
   determining an aggregation of communication links that combined have a capacity to provide data at the data transmission rate; and
   providing a communication over the aggregation of communication links in the network link, wherein providing the communication comprises activating a set of the communication links in the aggregation of communication links for providing the communication.

2. The method of claim 1, wherein the data transmission rate is selected based on the identified communication channel characteristics.

3. The method of claim 1, wherein the data transmission rate is selected based on the received capabilities of the devices associated with the network link.

4. The method of claim 1, wherein determining the aggregation of communication links occurs below a media access layer.

5. The method of claim 1, wherein determining the aggregation of communication links occurs above a media access layer.

6. A method, comprising:
   identifying characteristics of a communication channel in a network link, wherein the characteristics of the communication channel comprise a number of conductor pairs in the network link, a length of a network cable in the network link, or a type of cable in the network link, or a combination thereof;
   receiving information regarding capabilities of devices associated with the network link;
   selecting a data transmission rate;
   determining an aggregation of communication links that combined have a capacity to provide data at the data transmission rate; and
   providing a communication over the aggregation of communication links in the network link.

7. A method, comprising:
   identifying characteristics of a communication channel in a network link;
   receiving information regarding capabilities of devices associated with the network link, wherein receiving information regarding the capabilities of the devices associated with the network link comprises performing a capability exchange between network partners;
   selecting a data transmission rate;
   determining an aggregation of communication links that combined have a capacity to provide data at the data transmission rate; and providing a communication over the aggregation of communication links in the network link.

8. A method, comprising:
    identifying characteristics of a communication channel in a network link;
    receiving information regarding capabilities of devices associated with the network link;
    selecting a data transmission rate;
    determining an aggregation of communication links that combined have a capacity to provide data at the data transmission rate; and
    providing a communication over the aggregation of communication links in the network link, wherein the network link includes a plurality of conductor pairs, and at least one of the communications links is based on a separate physical layer device that interfaces with one of the plurality of conductor pairs.

9. The method of claim 8, wherein providing a communication over the aggregation of communication links in the network link includes activating a set of the communication links in the aggregation of communication links for providing the communication.

10. A system, comprising:
    at least two physical interfaces coupled to a network link, wherein the at least two physical interfaces individually include a physical layer device configured for electrical communication over a conductor pair in the network link;
    a computing machine configured to execute instructions, the instructions directing the computing machine to implement an aggregation layer, wherein the aggregation layer is implemented to:
        identify types of the conductor pairs in the network link;
        receive capabilities of devices coupled to the network link;
        determine a transmission rate;
        select a set of physical interfaces of the at least two physical interfaces; and
        provide a communication to the network link through the set of physical interfaces at the transmission rate.

11. The system of claim 10, wherein the selection of the set of physical interfaces is based on the identified types of the conductor pairs in the network link.

12. The system of claim 10, wherein the selection of the set of physical interfaces is based on the received capabilities of the devices coupled to the network link.

13. The system of claim 10, wherein the set of physical interfaces is selected such that an aggregation of the physical interfaces allows for the communication to the network link through the set of physical interfaces to be at the transmission rate.

14. The system of claim 10, further comprising a cable diagnostics module, wherein the aggregation layer is further implemented to receive information from the cable diagnostics module, and wherein the identification of the types of the conductor pairs is based on the information received from the cable diagnostics module.

15. A method, comprising:
    determining a type of a plurality of conductor pairs that are used in a network link that couples a network device to a link partner;
    selecting, based on the determined type of the plurality of conductor pairs, a data transmission rate for use by the network device over the network link; and
    configuring the network device to communicate at the data transmission rate through an aggregation of a plurality of communication links, wherein the plurality of communication links are based on respective separate physical layer devices that interface with respective ones of the plurality of conductor pairs.

16. The method of claim 15, wherein configuring the network device to communicate at the data transmission rate through the aggregation of the plurality of communication links occurs below a media access layer.

17. The method of claim 15, wherein configuring the network device to communicate at the data transmission rate through the aggregation of the plurality of communication links occurs above a media access layer.

18. The method of claim 15, further comprising, prior to determining the type of the plurality of conductor pairs, selecting a first number of communication links and providing a communication over the first number of communication links; and, subsequent to selecting a data transmission rate, selecting a second number of communication links for the aggregation of the plurality of communication links.

19. The method of claim 18, wherein the second number is greater than the first number.

20. The method of claim 18, wherein the communication links in the second number of communication links are different that the communication links in the first number of communication links.

* * * * *